US012059082B2

(12) United States Patent
Deshpande

(10) Patent No.: US 12,059,082 B2
(45) Date of Patent: Aug. 13, 2024

(54) COOLER FOR BEVERAGE CONTAINERS

(71) Applicant: PepsiCo, Inc., Purchase, NY (US)

(72) Inventor: Prashant Deshpande, Gurgaon (IN)

(73) Assignee: PepsiCo, Inc., Purchase, NY (US)

( * ) Notice: Subject to any disclaimer, the term of this patent is extended or adjusted under 35 U.S.C. 154(b) by 0 days.

(21) Appl. No.: 16/835,414

(22) Filed: Mar. 31, 2020

(65) Prior Publication Data

US 2020/0315373 A1 Oct. 8, 2020

(30) Foreign Application Priority Data

Apr. 5, 2019 (IN) ............................. 201941013807

(51) Int. Cl.
*A47F 3/02* (2006.01)
*A47F 3/04* (2006.01)
(Continued)

(52) U.S. Cl.
CPC .............. *A47F 3/02* (2013.01); *A47F 3/0408* (2013.01); *A47F 3/0478* (2013.01); *F25D 29/00* (2013.01);
(Continued)

(58) Field of Classification Search
CPC .. A47F 3/02; A47F 3/0408; A47F 1/12; A47F 3/0491; F25D 29/00; G07F 9/105;
(Continued)

(56) References Cited

U.S. PATENT DOCUMENTS 2,250,557 A * 7/1941 Tull ......................... F25D 17/06 62/380
2,260,643 A * 10/1941 Rosan .................... G07F 7/0609 221/18
(Continued)

FOREIGN PATENT DOCUMENTS

CN 107077767 A 8/2017
EP 1821053 A1 * 8/2007 ............. F25D 29/00
(Continued)

OTHER PUBLICATIONS

International Search Report and Written Opinion of the International Searching Authority in International Application No. PCT/US2020/025983, dated Jun. 30, 2020 (8 pages).
(Continued)

*Primary Examiner* — Rakesh Kumar
(74) *Attorney, Agent, or Firm* — Sterne, Kessler, Goldstein & Fox P.L.L.C.

(57) ABSTRACT

A cooler for storing beverage containers. The cooler includes a housing defining an interior volume for storing a first beverage container at a first predetermined temperature and a compartment within the interior volume of the housing for storing a second beverage container at a second predetermined temperature that is at or below a freezing point of the beverage. The cooler further includes a user interface for receiving a user input to dispense the second beverage container, and a delivery portal for providing access to the second beverage container. A chute is configured to communicate the second beverage container from the compart-
(Continued)

ment to the delivery portal and to cause nucleation of the beverage and form a slush beverage. A cooling unit is configured to maintain the interior volume of the housing at the first predetermined temperature and the compartment at the second predetermined temperature.

15 Claims, 8 Drawing Sheets

(51) Int. Cl.
*F25D 29/00* (2006.01)
*G07F 9/10* (2006.01)
*G07F 11/34* (2006.01)
*G07F 17/00* (2006.01)

(52) U.S. Cl.
CPC .............. *G07F 9/105* (2013.01); *G07F 11/34* (2013.01); *G07F 17/0071* (2013.01)

(58) Field of Classification Search
CPC ...... G07F 11/34; G07F 17/0071; G07F 11/08; G07F 11/10; G07F 11/42; G07F 11/52; G07F 11/58; G07F 7/0078
USPC ....... 221/66, 1, 97, 150 R, 82, 150 HC, 102, 221/151, 93, 133; 194/4; 62/246
See application file for complete search history.

(56) References Cited

U.S. PATENT DOCUMENTS 2,266,025 A * 12/1941 Grau ....................... G07F 11/52 221/152
2,371,845 A * 3/1945 Robison .................. G07F 11/04 221/281
2,496,304 A * 2/1950 Muffly .................... F25D 17/02 62/331
2,671,001 A * 3/1954 Ossanna, Jr. ......... A47F 3/0408 62/250
2,711,241 A * 6/1955 Abrahamsen ........... F25D 25/00 221/256
2,935,225 A * 5/1960 Jordan .................... G07F 11/54 221/277
2,956,660 A * 10/1960 Ronald ................... G07F 11/34 221/9
3,055,548 A * 9/1962 Allegri ...................... A47F 1/10 221/281
3,231,323 A * 1/1966 Wells ........................ A47F 7/28 312/211
4,248,358 A * 2/1981 Muench .................. G07F 11/04 221/150 A
4,287,992 A * 9/1981 Takemori ................ A47F 1/087 312/45
4,411,351 A * 10/1983 Lowder ................. G07F 7/0609 194/212
4,687,119 A * 8/1987 Juillet ................. G07F 17/0078 221/124
4,823,984 A * 4/1989 Ficken .................... G07F 11/24 221/195
4,920,763 A * 5/1990 Provest ................... F25D 17/02 62/378
5,009,329 A * 4/1991 Farrentine ............... G07F 11/34 221/175
5,201,191 A * 4/1993 Bustos .................. A47F 3/0408 211/187
5,237,835 A * 8/1993 Brochier ................. F25D 17/02 62/336
5,247,798 A * 9/1993 Collard, Jr. ............. F25B 21/02 221/281
5,248,102 A * 9/1993 Bohn .................. B02C 19/0087 241/DIG. 38
5,303,214 A * 4/1994 Kulakowski ......... G11B 17/225
5,335,818 A * 8/1994 Maldanis ................ G07F 11/24 49/94
5,499,707 A * 3/1996 Steury ....................... G07F 9/02 414/280
5,689,967 A * 11/1997 Fl.o slashed.ysvik ....................... F25D 31/007 62/275
RE35,743 E * 3/1998 Pearson .................. G07F 9/002 221/9
5,890,622 A * 4/1999 Farmont ............... G07F 17/145 194/902
6,073,460 A * 6/2000 Credle, Jr. ................ A47F 3/11 62/250
6,173,582 B1 * 1/2001 Hixson ................... F25D 25/00 62/457.4
6,389,822 B1 * 5/2002 Schanin .................. F25D 29/00 62/89
6,390,328 B1 * 5/2002 Obermeier .............. G07F 11/24 221/266
6,464,104 B1 * 10/2002 Waddell .............. G07F 17/0078 221/150 A
6,598,789 B1 * 7/2003 Matsumoto ......... G03F 7/70741 235/383
6,862,896 B1 * 3/2005 Seidl ......................... F25D 3/08 220/592.16
7,150,155 B2 * 12/2006 Faber ...................... G07F 11/14 62/381
7,377,123 B2 * 5/2008 Byrne ....................... G07F 9/10 221/256
7,497,352 B2 * 3/2009 Segiet ..................... G07F 9/105 221/220
7,559,482 B2 * 7/2009 Coveley ............. G06K 7/10178 235/375
7,621,139 B2 * 11/2009 Ha ......................... A23G 9/045 62/135
8,028,855 B2 * 10/2011 White ..................... G07F 11/10 221/312 R
8,151,598 B2 * 4/2012 Wittern, Jr. ............. G07F 9/105 62/440
8,161,756 B2 * 4/2012 Kutta .................... F25D 31/007 62/63
8,360,272 B2 * 1/2013 Piersant ................ G07F 7/0609 221/102
2002/0005043 A1 * 1/2002 Rudick ................. F25D 31/007 62/6
2003/0218023 A1 * 11/2003 Zangari ................... G07F 11/34 221/150 R
2004/0026446 A1 * 2/2004 Mori ....................... G07F 11/14 221/281
2005/0056047 A1 * 3/2005 Carmichael ............. F25D 25/00 62/465
2005/0234590 A1 * 10/2005 Sato ....................... G06Q 20/20 705/16
2007/0012051 A1 1/2007 Acton et al.
2007/0163275 A1 * 7/2007 Ha .......................... F25D 29/00 62/340
2007/0163289 A1 * 7/2007 Hahm ................... F25D 31/007 62/414
2007/0163290 A1 7/2007 Shin et al.
2008/0098761 A1 * 5/2008 Zangari ................. A47F 3/0408 236/78 D
2008/0245079 A1 * 10/2008 Lim ........................ F25D 23/12 62/426
2008/0245820 A1 * 10/2008 Pfister ..................... G07F 11/24 221/124
2009/0029016 A1 * 1/2009 Pfister ................... F25D 17/065 99/485
2009/0076650 A1 * 3/2009 Faes ........................ G07F 11/42 700/231
2009/0090734 A1 4/2009 Wittern, Jr. et al.
2009/0314012 A1 * 12/2009 Lim ...................... F25D 23/126 62/66
2011/0006074 A1 * 1/2011 Machers ................. G07F 11/34 221/282
2011/0186591 A1 * 8/2011 Pfister ................... F25D 31/007 221/97

(56) References Cited

U.S. PATENT DOCUMENTS

| | | | | |
|---|---|---|---|---|
| 2012/0173016 | A1* | 7/2012 | Piersant | G07F 7/0609 700/225 |
| 2015/0264968 | A1* | 9/2015 | Shuntich | A23L 5/32 99/275 |
| 2018/0120023 | A1* | 5/2018 | Shuntich | F25D 31/007 |
| 2019/0256337 | A1* | 8/2019 | Bhutani | B67D 1/0057 |
| 2020/0107559 | A1* | 4/2020 | Deshpande | A23G 9/224 |
| 2020/0312078 | A1* | 10/2020 | Deshpande | G07F 13/10 |
| 2020/0315373 | A1* | 10/2020 | Deshpande | F25D 29/00 |
| 2021/0161182 | A1* | 6/2021 | Stoenescu | A23G 9/045 |

FOREIGN PATENT DOCUMENTS

| | | | | | |
|---|---|---|---|---|---|
| JP | S55-149168 | U | | 10/1980 | |
| JP | 10340380 | A | * | 12/1998 | G07F 9/10 |
| JP | 2003214753 | A | * | 1/2002 | |
| JP | 2016-071485 | A | | 5/2016 | |
| JP | 2016-122388 | A | | 7/2016 | |
| JP | 2016-189116 | A | | 11/2016 | |
| JP | WO2017126140 | A1 | * | 7/2017 | F25D 31/007 |
| KR | 101 502 472 | B1 | | 3/2015 | |
| KR | 101502472 | B1 | * | 3/2015 | A47F 1/087 |
| WO | WO-2010008611 | A2 | * | 1/2010 | F25B 29/003 |
| WO | WO 2017/126140 | A1 | | 7/2017 | |

OTHER PUBLICATIONS

Extended European Search Report in counterpart European Application No. EP 20782267.7, mailed Nov. 9, 2022; 2 pages.

* cited by examiner

COOLER FOR BEVERAGE CONTAINERS

FIELD

Embodiments described herein generally relate to coolers for storing beverage containers. Specifically, embodiments described herein relate to coolers for storing a first beverage container at a first temperature and a second beverage container at a second temperature that differs from the first temperature.

BACKGROUND

Beverage containers are often stored in refrigerated coolers. Such coolers are often used in grocery stores, convenience stores, restaurants, concession stands, movie theaters, and the like. The coolers serve to maintain the beverage containers at a cool temperature so that the beverage containers are ready to be consumed by a consumer. Coolers also serve to store and organize beverage containers so that the beverage containers are on display to consumers. However, conventional coolers have limited functionality and merely store beverage containers at a single temperature.

Therefore, a continuing need exists for a cooler for beverage containers that has additional functionality for providing consumers with access to a wider variety of beverage options.

BRIEF SUMMARY OF THE INVENTION

Some embodiments relate to a cooler for beverage containers that includes a housing defining an interior volume for storing a first beverage container at a first predetermined temperature, and a compartment arranged within the interior volume of the housing for storing a second beverage container at a second predetermined temperature that is at or below a freezing point of a beverage within the second beverage container, wherein the compartment is enclosed. The cooler further includes a user interface for receiving a user input to dispense the second beverage container from the compartment, and a delivery portal for providing access to the second beverage container. A chute is configured to communicate the second beverage container from the compartment to the delivery portal, and the chute is configured to subject the second beverage container to a mechanical impact so as to cause nucleation of the beverage within the second beverage container and form a slush beverage within the second beverage container. A cooling unit is configured to maintain the interior volume of the housing at the first predetermined temperature and the compartment at the second predetermined temperature.

Some embodiments relate to a cooler for beverage containers that includes a housing defining an interior volume for storing a first beverage container, and a compartment arranged within the interior volume of the housing for storing a second beverage container. The compartment is enclosed. The cooler includes a user interface for receiving a user input to dispense the second beverage container from the compartment, and a door movably connected to the housing and having a delivery bin, wherein the door is movable between a closed position in which the interior volume of the housing is inaccessible, and an open position in which the interior volume of the housing is accessible to a consumer. A chute is connected to the compartment that is configured to communicate the second beverage container to the delivery bin of the door when the door is in the closed position, such that the second beverage container is accessible from an exterior of the housing via the delivery bin.

Some embodiments relate to a cooler for beverage containers that includes a housing having a door and defining an interior volume for storing a first beverage container, wherein the interior volume of the housing is accessible by opening the door of the housing. A compartment is arranged within the interior volume of the housing for storing a second beverage container, and the compartment is enclosed such that the second beverage container is inaccessible from the interior volume of the housing. A delivery portal is arranged on the housing, wherein the delivery portal is in communication with the compartment such that when the second beverage container is dispensed, the second beverage container is accessible from an exterior of the housing via the delivery portal.

In any of the various embodiments discussed herein, the compartment may include an insulated material.

In any of the various embodiments discussed herein, the compartment may include an air inlet port and an adjustable damper configured to regulate a flow of air into the compartment through the air inlet port. In some embodiments, the compartment may include a temperature sensor configured to determine a temperature within the compartment, wherein the temperature sensor is in communication with a control unit that controls an orientation of the adjustable damper so as to maintain the compartment at the second predetermined temperature. In some embodiments, the compartment may include an air outlet port for allowing a flow of air to exit the compartment.

In any of the various embodiments discussed herein, the compartment may include an internal passageway for guiding the second beverage container toward the chute.

In any of the various embodiments discussed herein, the second predetermined temperature may be −20° C. to 0° C. In some embodiments, the second predetermined temperature may be −10° C. to −7° C.

In any of the various embodiments discussed herein, the chute may include a first section that is arranged parallel to a longitudinal axis of the cooler, and a second section is arranged at an angle relative to the first section such that the chute is configured to subject the second beverage container to a gravitational drop such that a beverage within the second beverage container undergoes nucleation. In some embodiments, the second section of the chute may be arranged at a downward angle relative to a transverse plane, such that the second section is configured to allow the second beverage container to move along the second section toward delivery portal under the force of gravity.

In any of the various embodiments discussed herein, the cooling unit may include an evaporator for distributing a flow of air to the compartment.

In any of the various embodiments discussed herein, the housing may include a door that is movable from a closed position to an open position in which the interior volume of the housing is accessible.

In any of the various embodiments discussed herein, the door may include a transparent portion such that an interior volume of the housing is visible from an exterior of the housing.

In any of the various embodiments discussed herein, the delivery portal may be in communication with the compartment via a chute arranged within the housing.

In any of the various embodiments discussed herein, the cooler may include a user interface for receiving a user input to dispense the second beverage container.

In any of the various embodiments discussed herein, the delivery portal may be arranged on the door of the housing, and the first beverage container is not provided to the delivery portal.

In any of the various embodiments discussed herein, the cooler may include a cooling unit configured to maintain the interior volume of the housing at a first predetermined temperature and the compartment at a second predetermined temperature at or below a freezing point of a beverage within the second beverage container.

BRIEF DESCRIPTION OF THE DRAWINGS/FIGURES

The accompanying drawings, which are incorporated herein and form a part of the specification, illustrate the present disclosure and, together with the description, further serve to explain the principles thereof and to enable a person skilled in the pertinent art to make and use the same.

DETAILED DESCRIPTION OF THE INVENTION

Figure 1:
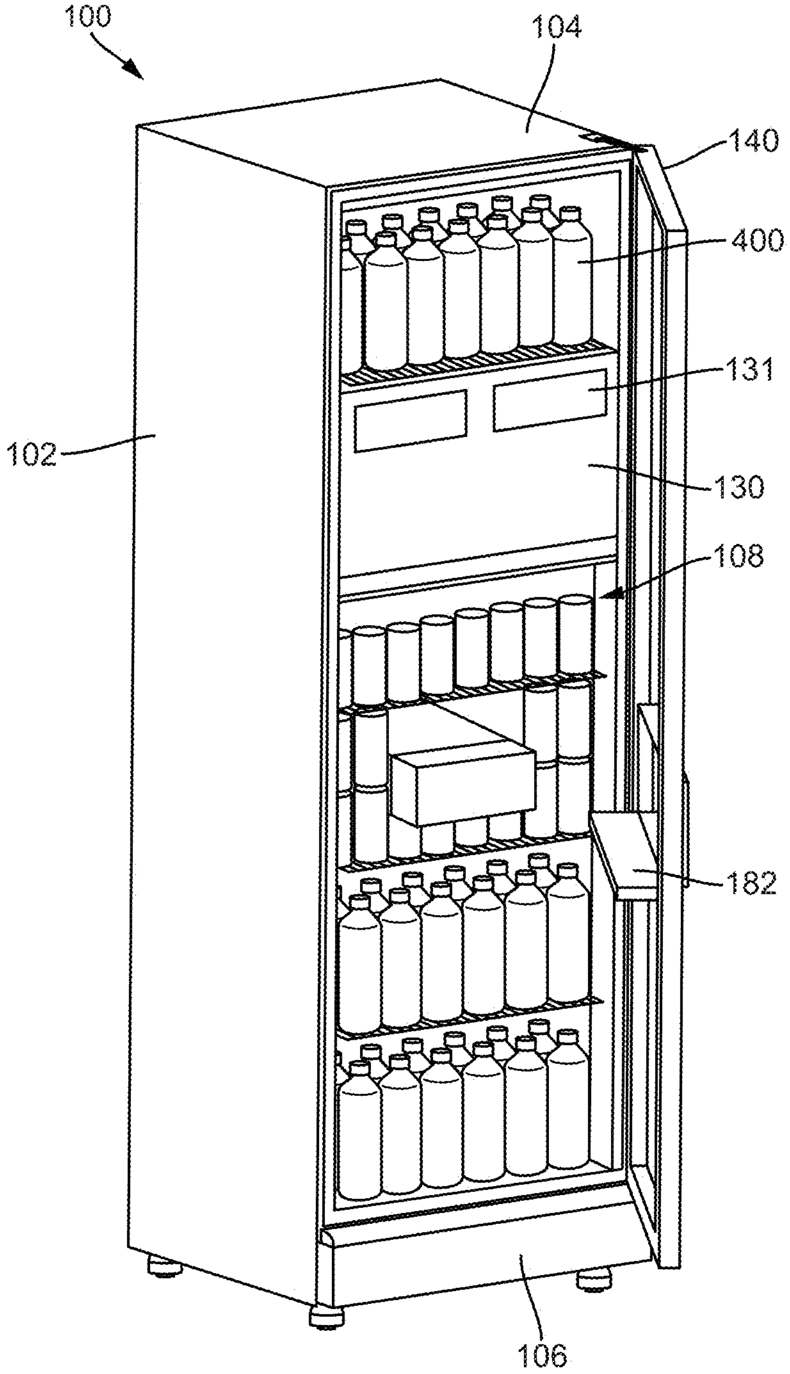
FIG. 1 shows a perspective view of a cooler for beverage containers according to an embodiment.

Reference will now be made in detail to representative embodiments illustrated in the accompanying drawing. It should be understood that the following descriptions are not intended to limit the embodiments to one preferred embodiment. To the contrary, it is intended to cover alternatives, modifications, and equivalents as can be included within the spirit and scope of the described embodiments as defined by the claims.

Coolers for beverage containers are often used to store beverages at a cool temperature so that the beverage containers are chilled. However, coolers have limited functionality and are generally not capable of simultaneously storing a first group of beverages at a first temperature and a second group of beverages at a second temperature. Providing a consumer with the option to select a beverage container at a particular temperature provides consumers with increased options when selecting a beverage. For example, consumers may benefit from having the option to purchase a beverage container that is chilled or a beverage container that contains a partially-frozen slush beverage.

Further, some storeowners may wish to provide their customers with the option to purchase chilled or slush beverages. However, some stores may be unable to or may simply prefer not to dedicate space in the store to a slush beverage vending or dispensing machine. Thus, in order to save space while providing consumers with additional beverage options, it would be desirable to provide a cooler for storing chilled beverages and that can also store and dispense a slush beverage in a beverage container.

Some embodiments described herein relate to a cooler for beverage containers that is capable of storing and providing consumers with both chilled beverage containers and beverage containers containing a slush beverage (e.g., a supercooled beverage). In some embodiments described, a cooler for beverage containers includes a housing having an interior volume for storing beverage containers at a first predetermined temperature, such as a temperature suitable for providing chilled beverages, and a compartment within the interior volume of the housing that stores beverage containers at a second predetermined temperature that is at or below a freezing point of the beverages so that the beverages are supercooled and can thus be served as slush beverages.

In some embodiments, a cooler 100 includes a housing 102 having an interior volume 108 for storing first beverage containers 400 at a first predetermined temperature and a compartment 130 within interior volume 108 for storing second beverage containers 500 at a second predetermined temperature that is lower than the first predetermined temperature. Cooler 100 may include a door 140 that can be moved from a closed position in which interior volume 108 is inaccessible from an exterior of the housing 102, to an open position so that consumers can access the first beverage containers 400 within interior volume 108 of housing 102. Cooler 100 may further include a delivery portal 180 in communication with compartment 130 such as by a chute 170. Chute 170 may be configured to agitate the beverage within second beverage container 500 and communicate second beverage container 500 to delivery portal 180 from compartment 130 for providing a consumer with access to second beverage container 500. Cooler 100 may also include a cooling unit 160 for maintaining interior volume 108 of housing 102 and compartment 130 at the first and second predetermined temperatures, respectively.

In any of the various embodiments described herein, the term "beverage container" may refer to any of various types of containers for storing a beverage. The beverage container may be, for example, in the form of a bottle or can. The beverage container may be composed of any of various materials, including glass, metal, such as aluminum, or plastic, such as polyethylene terephthalate (PET), among others.

As used herein, the term "beverage" includes any consumable free-flowing liquid or semi-liquid product, which may be carbonated or non-carbonated, including but not limited to soft drinks, water, carbonated water, dairy beverages, juices, alcoholic beverages, sports drinks, smoothies, coffee beverages, tea beverages, and milkshakes, among others. Further, the term, "slush beverage" includes any beverage as described herein that is at least partially frozen, such that the beverage is part liquid and part solid.

Figure 2:
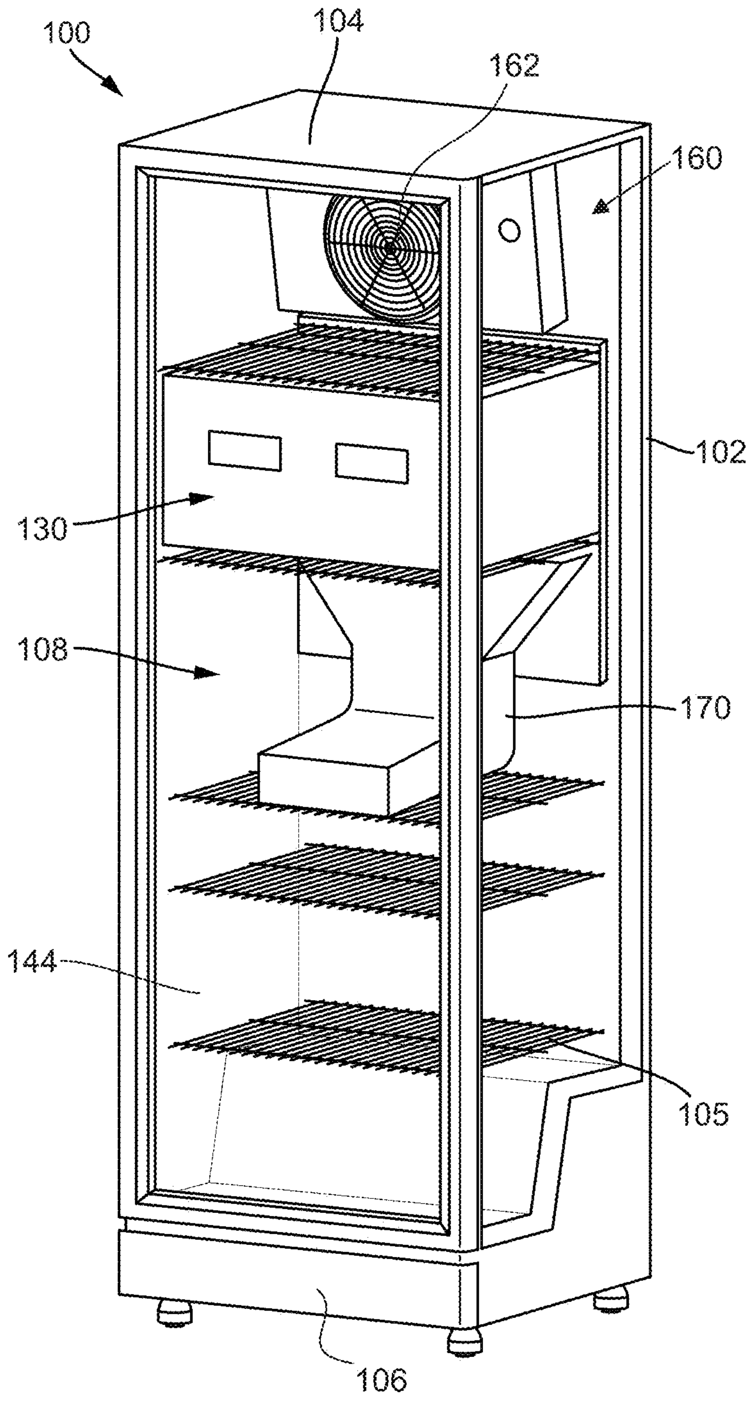
FIG. 2 shows a perspective view of the cooler of FIG. 1 without beverage containers.
Figure 3:
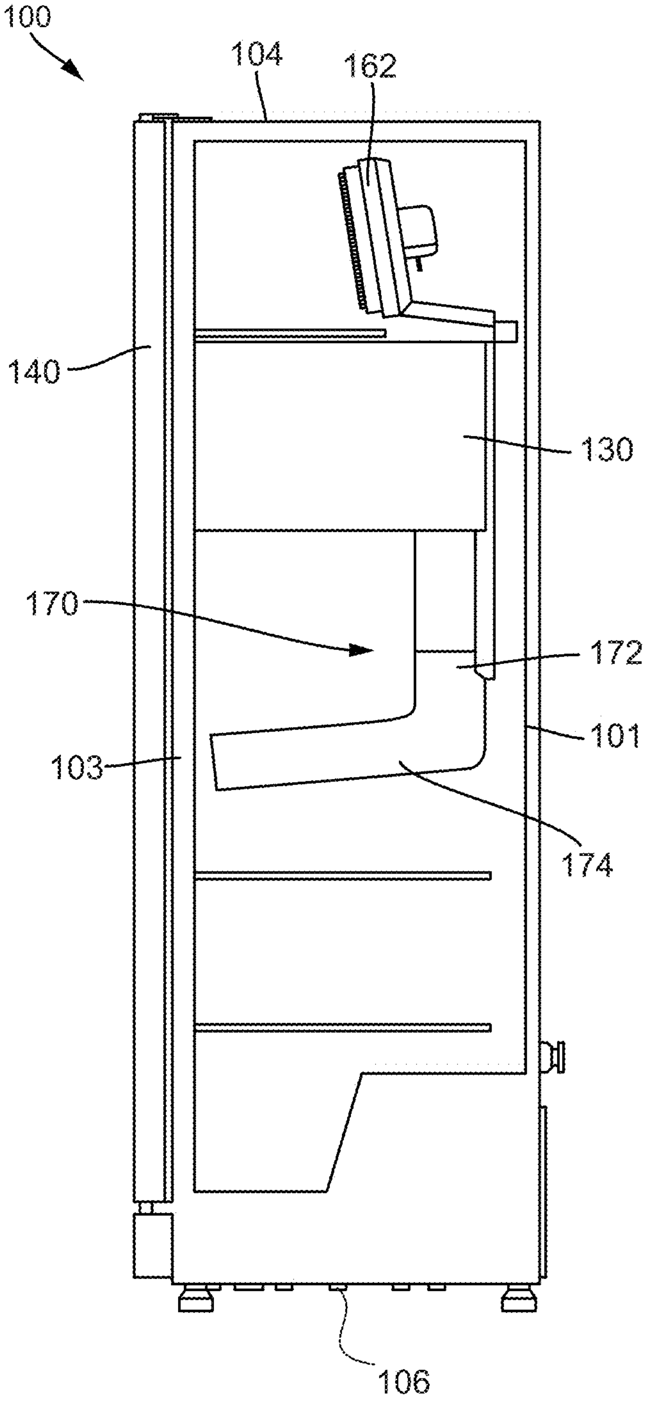
FIG. 3 shows a longitudinal cross sectional view of a side of the cooler of FIG. 1.
Figure 4:
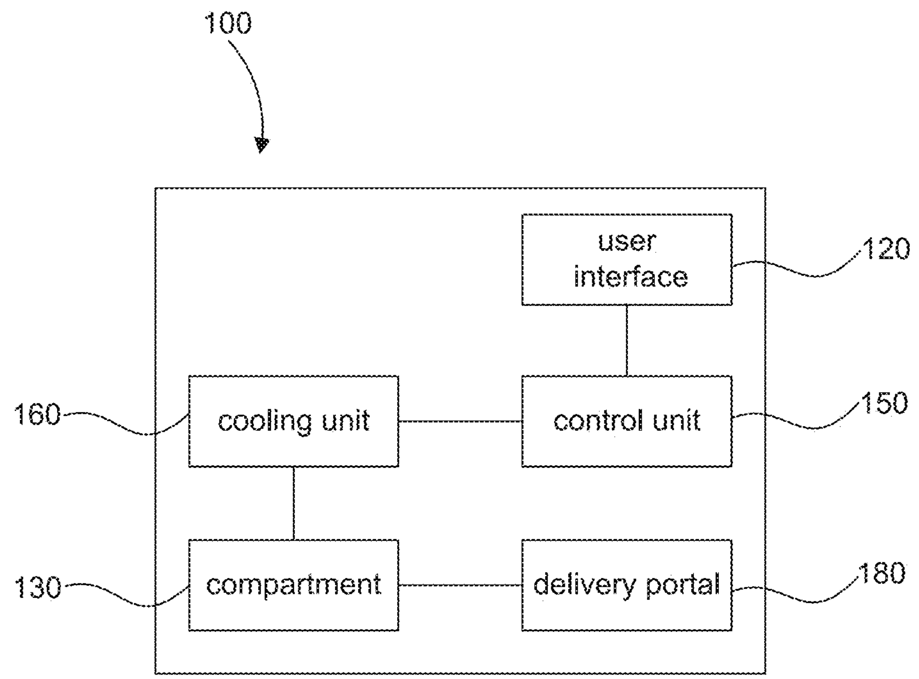
FIG. 4 shows a schematic of the components of a cooler according to an embodiment.

In some embodiments, a cooler 100 is configured to a first beverage container 400 at a first predetermined temperature and a second beverage container 500 at second predetermined temperature, as shown for example at FIGS. 1-3. Cooler 100 includes a housing 102 defining an interior volume 108. Housing 102 may be in the form of a cabinet. Housing 102 may be shaped generally as a rectangular prism, or may have any of various other shapes. For example, housing 102 may include one or more rounded sidewalls. Cooler 100 may be a freestanding or stand-alone device.

In some embodiments, housing 102 of cooler 100 may include one or more shelves 105 within interior volume 108 for facilitating storage, organization, and display of first beverage containers 400. Shelves 105 may be generally planar in configuration. Shelves 105 may be solid plates or may be in the form of wire racks or grates so as to promote airflow through interior volume 108 of cooler 100. Each shelf 105 may be arranged in a plane transverse to a longitudinal axis of cooler 100. Further, shelves 105 may be spaced from one another along a longitudinal axis of cooler 100 from a lower end 106 of housing 102 to an upper end 104 of housing 102.

In some embodiments, housing 102 of cooler 100 may further include a transparent portion 144 such that consumers may view interior volume 108 of cooler 100 and products therein from an exterior of cooler 100. Transparent portion 144 may include a transparent material such as glass, which may include a silica-based glass, or a transparent polymer material, such as polycarbonate. Transparent portion 144 allows consumers to view available beverages without having to open cooler 100 which may result in variation of the temperature within housing 102 and may allow moisture to enter housing 102.

In some embodiments, cooler 100 further includes a door 140 that allows consumers to access interior volume 108 of housing 102 so that the consumer may retrieve a first beverage container 400. Door 140 may form a portion of housing 102 defining interior volume 108 of housing 102. Thus, in some embodiments, door 140 may form a sidewall or a portion of a sidewall of cooler 100. Door 140 may be movable between a first position (a closed position) and a second position (an open position). In some embodiments, door 140 may be pivotally connected to housing 102 such that door 140 moves between first and second positions by rotating about a hinge or pivot point. In some embodiments, door 140 may be slidably connected to housing 102 so as to move between the first and second positions by sliding along a track or tracks of housing 102. Door 140 of housing 102 may include transparent portion 144, as discussed above, such that a consumer may view an interior volume 108 of housing 102 through transparent portion 144 of door 140. Substantially the entire door 140 may include transparent portion 144 or only a portion of door 140 may be transparent, such as a central portion of door 140.

Cooler 100 further includes a compartment 130 arranged within interior volume 108 of housing 102. Compartment 130 is configured to store a second beverage container 500 separate from first beverage container 400. In particular, compartment 130 is configured to store a second beverage container 500 (see FIG. 9) at a second predetermined temperature, and the second predetermined temperature may be a temperature at or below a freezing point of a beverage within second beverage container 500 such that the beverage is supercooled. Compartment 130 may have any of various shapes, and in some embodiments, compartment 130 is shaped as a cube or rectangular prism, and compartments 130 defines an interior volume for storing second beverage containers 500. Compartment 130 may be composed of an insulated material, such as expanded polystyrene (EPS) foam, among other insulating materials that resist heat transfer into compartment 130. Compartment 130 is enclosed such that a second beverage container 500 stored within compartment 130 is inaccessible from an exterior of compartment 130. Thus, when a door 140 of cooler 100 is opened, a consumer may retrieve a first beverage container 400 from an interior volume of cooler 100, but cannot similarly retrieve a second beverage container 500 stored within enclosed compartment 130. Second beverage container 500 is instead dispensed to a consumer via a delivery portal 180 as described below. By limiting access to compartment 130, compartment 130 can be maintained at the second predetermined temperature without temperature variations caused by consumers accessing compartment 130 and second beverage containers 500 therein.

In some embodiments, compartment 130 may define a beverage container inlet 131 (see FIG. 1) for loading beverage containers into compartment 130. Beverage container inlet 131 may be in the form of a slot that is sized and shaped to receive a beverage container. Thus, beverage container inlet 131 may have a can-shape, a bottle-shape, or may have a rectangular, circular, or oval shape, among others. Beverage container inlet 131 may be configured to receive a beverage container in a sideways or horizontal orientation such that beverage containers are stored within compartment 130 on their sides. Beverage container inlet 131 may further include a movable cover that removably covers beverage container inlet 131 so as to facilitate maintenance of compartment 130 at the second predetermined temperature.

Figure 9:
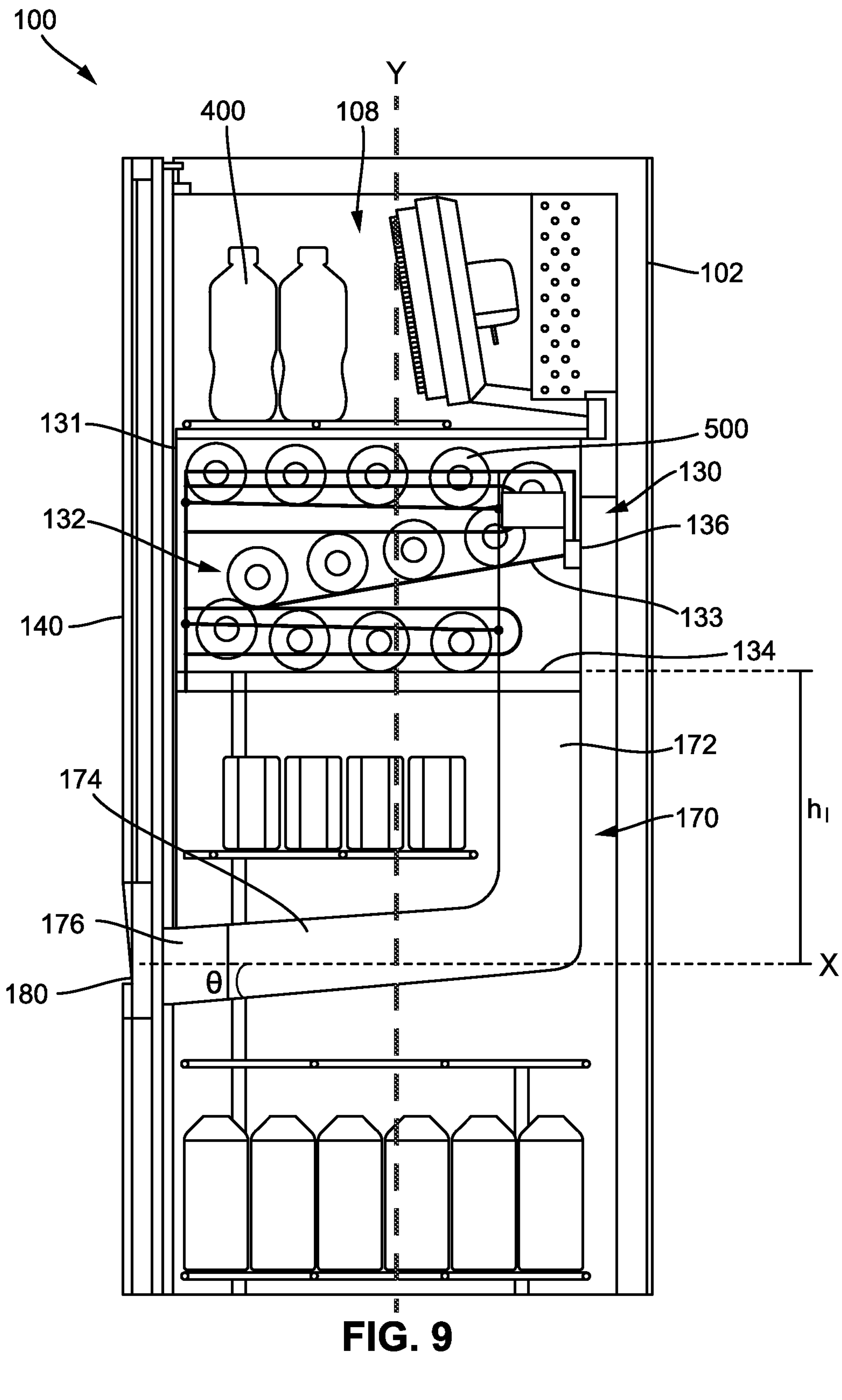
FIG. 9 shows a longitudinal cross sectional view of a side of a cooler according to an embodiment.

In some embodiments, compartment 130 may further define an internal passageway 132 configured to sequentially guide second beverage containers 500 from beverage container inlet 131 to a beverage container outlet 134 which may be connected to chute 170 (see FIG. 9). Second beverage containers 500 are sequentially guided through passageway 132 such that a beverage container first inserted into compartment 130 is the first to be dispensed from compartment 130. Passageway 132 may have a serpentine configuration. Further, in some embodiments, passageway 132 may be defined by one or more tracks 133. Tracks 133 may be wire tracks having sloped surfaces that are configured to allow second beverage containers 500 to roll along tracks 133 under the force of gravity. Second beverage containers 500 may be stored within compartment 130 in a sideways orientation to facilitate rolling of second beverage containers 500 along passageway 132.

In some embodiments, cooler 100 further includes a cooling unit 160 that is configured to maintain a temperature of interior volume 108 of housing 102 at a first predetermined temperature, and further to maintain a temperature of compartment 130 at a second predetermined temperature. Second predetermined temperature may differ from and may be less than the first predetermined temperature. In some embodiments, first predetermined temperature is a temperature suitable to cool or chill first beverage containers 400 and may be, for example, about 0.5° C. to about 10° C., or about 1° C. to about 7° C., or about 2° C. to about 5° C. As will be understood by one of ordinary skill in the art, the first predetermined temperature may be selected based on the type of beverage stored within first beverage container. In some embodiments, second predetermined temperature may be about −20° C. to about 0° C., or about −10° C. to about −7° C., such that a beverage within second beverage container 500 is at or below a freezing point of the beverage. Second predetermined temperature may be selected such that a particular beverage within second beverage container is supercooled. As will be understood by one of ordinary skill in the art, different beverages may have different freezing points. Thus, second beverage containers 500 stored within compartment 130 may be supercooled. A "supercooled" liquid is a liquid that is at a temperature at or below its freezing point but remains in a liquid state. The supercooled liquid will remain in a liquid state until agitated, such as by shaking the beverage container or subjecting the beverage container to a mechanical impact or jerk. Agitation causes the supercooled liquid to undergo a phase change so as to form a solid or partial solid. In this way, by maintaining a beverage at the second predetermined temperature, second beverage container 500 provides a consumer with a supercooled beverage, or a slush beverage within second beverage container 500 when agitated.

Figure 5:
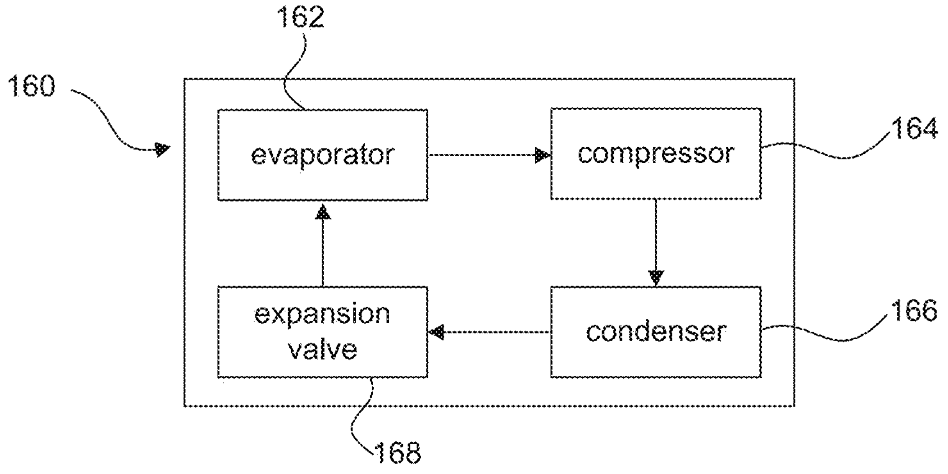
FIG. 5 shows a schematic of the components of a cooling unit of a cooler according to an embodiment.

In some embodiments, cooling unit 160 may include an evaporator 162 in communication with a compressor 164, a condenser 166 and an expansion valve 168 for circulating a refrigerant, as shown for example at FIG. 5. Evaporator 162 distributes cooled air to interior volume 108 of housing 102 and further to compartment 130 within housing 102. Evaporator 162 may include a fan to promote air circulation. In alternate embodiments, other types of cooling units capable of maintaining interior volume 108 of housing 102 at the first predetermined temperature and compartment 130 at the second predetermined temperature may be used, such as thermoelectric refrigeration systems, among others.

In some embodiments, compartment 130 is arranged toward an upper end 104 of housing 102 of cooler 100, such that compartment 130 is directly adjacent to evaporator 162 arranged at upper end 104 of housing 102. Generally, air supplied by evaporator 162 is at the lowest temperature in the immediate vicinity of evaporator 162 and as the air circulates within housing 102 the temperature of the air increases. Thus, by positioning compartment 130 directly adjacent to evaporator 162, compartment 130 is supplied with cooled air to help maintain compartment 130 at the second predetermined temperature.

Figure 7:
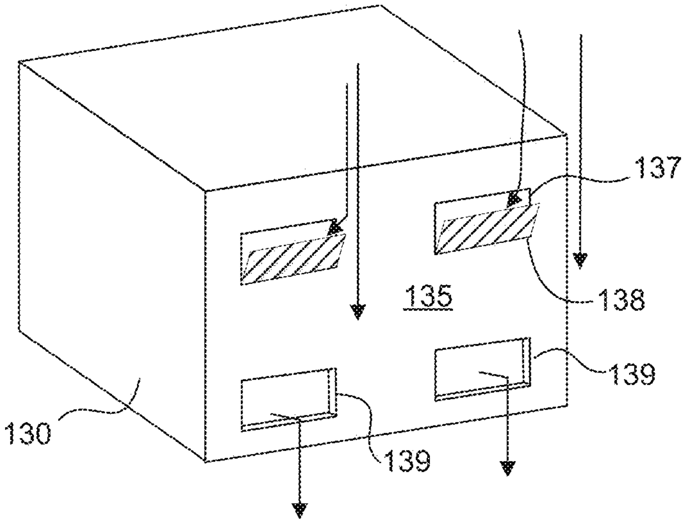
FIG. 7 shows a rear perspective view of the compartment of a cooler according to an embodiment.

In some embodiments, compartment 130 includes air inlet ports 137 for receiving cooled air from evaporator 162 and air outlet ports 139 for allowing air within compartment 130 to escape from compartment 130. In some embodiments, air inlet ports 137 and air outlet ports 139 may be arranged on a rear surface 135 of compartment 130, as shown in FIG. 7. However, in alternate embodiments, air inlet ports 137 and/or air outlet ports 139 may be arranged on various portions of compartment 130, such as on an upper surface or lower surface of compartment 130, respectively.

In some embodiments, an adjustable damper 138 is arranged at each air inlet port 137 of compartment 130. Adjustable dampers 138 serve to regulate the flow of cooled air into compartment 130 so as to regulate a temperature of compartment 130, so as to maintain second compartment 130 at the second predetermined temperature, which in some embodiments may be, for example, about −20° C. to about 0° C. Adjustable dampers 138 may include a panel that is adjustable in pitch or orientation so as to control the amount of air entering air inlet ports 137. Adjustable dampers 138 may be adjusted by a drive mechanism, such as a motor or actuator. Adjustable dampers 138 may be electronically controlled such that an orientation of damper 138 can be adjusted to increase or decrease the amount of air flow through air inlet port 137 which increases or decreases the temperature of compartment 130.

Figure 8:
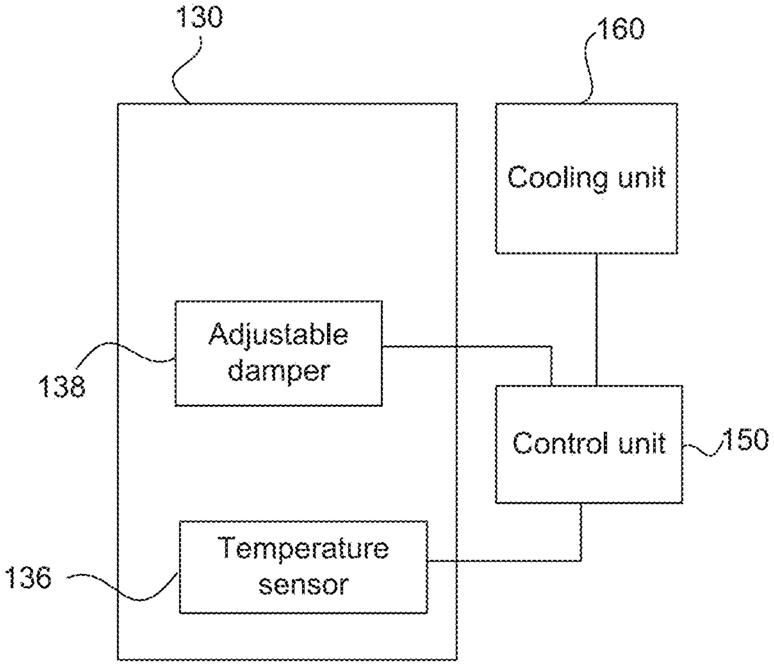
FIG. 8 shows a schematic diagram of the components of the compartment of a cooler according to an embodiment.

In some embodiments, compartment 130 further includes at least one temperature sensor 136, as shown in FIG. 8. Temperature sensor 136 may be positioned within compartment 130 so as to determine a temperature within compartment 130. Temperature sensor 136 may be a thermistor or thermocouple, among other temperature sensing devices. In order to maintain temperature within compartment 130 at the second predetermined temperature, temperature sensor 136 is in communication with a control unit 150, wherein control unit 150 is configured to adjust an orientation or pitch of adjustable dampers 138 at air inlet ports 137 of compartment 130 to raise or lower the temperature within compartment 130 based on the temperature as determined by temperature sensor 136. For example, if predetermined temperature of compartment 130 is −8° C., and temperature sensor 136 detects a temperature within compartment 130 of −2° C., control unit 150 adjusts adjustable dampers 138 so as to allow increased air flow into compartment 130 in order to lower the temperature.

Figure 6:
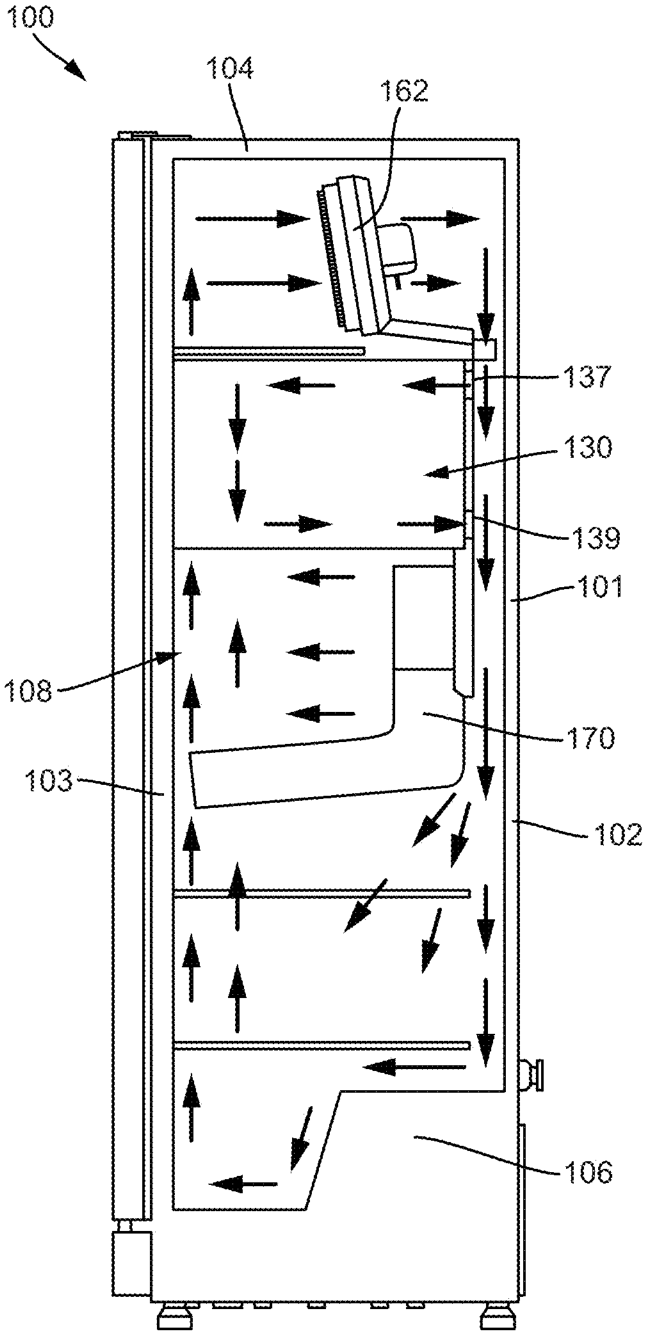
FIG. 6 shows a longitudinal cross sectional view of a side of a cooler according to an embodiment with arrows indicating a direction of air flow within the cooler.

In operation of cooler 100, evaporator 162 provides air flow within housing 102 in a manner as shown for example at FIG. 6. Cooled air flows from evaporator 162 into interior volume 108 of housing 102 of cooler 100 and also into compartment 130 through air inlet ports 137 of compartment 130. The amount of air that flows into compartment 130 via air inlet ports 137 is regulated by adjustable dampers 138. Air circulates within compartment 130 so as to cool second beverage containers therein. Air within compartment 130 exits compartment 130 through air outlet ports 139 and flows into interior volume 108 of housing 102 of cooler 100.

In order to dispense a second beverage container 500 from compartment 130, cooler 100 may further include a user interface 120 for receiving a user input to dispense a second beverage container 500 from compartment 130. User input may be a selection of a second beverage container that is supercooled and is stored within compartment 130. User interface 120 is arranged on housing 102 and may be arranged on an exterior of housing 102 such that user interface 120 can be accessed without opening a door 140 of cooler 100. User interface 120 may include one or more buttons, levers, handles, switches, or actuators for receiving the user input. In some embodiments, user interface 120 may include an electronic display, such as a liquid crystal display (LCD) or a light emitting diode (LED) display for displaying instructions or other information to a consumer. In some embodiments, user interface 120 may include a touch-screen display for receiving user input and displaying instructions or information. User interface 120 may further include means for accepting a payment from the user, such as a credit card reader, a mobile device or mobile application scanner, or a slot for receiving coins, paper currency, or tokens, among other payment methods.

Cooler 100 may include a control unit 150 for coordinating an operation for dispensing a second beverage container 500 from compartment 130. Upon receipt of a user input to dispense a second beverage container 500 from user interface 120, control unit 150 may cause a second beverage container 500 to be released from compartment 130 such that second beverage container 500 is communicated to a delivery portal 180 of cooler 100. Delivery portal 180 may be arranged in any of various portions of housing 102 or door 140 of housing 102 so as to provide a consumer with access to the dispensed beverage container.

In some embodiments, second beverage container 500 is communicated from compartment 130 to delivery portal 180 via a chute 170, as shown at FIG. 9. Chute 170 may be configured to subject a second beverage container 500 to a mechanical impact so as to cause nucleation of a beverage within second beverage container 500 in order to provide a slush beverage within second beverage container 500. First beverage containers 400 are not similarly provided to delivery portal 180 and instead first beverage containers 400 must be retrieved from interior volume 108 of cooler 100. In some embodiments, compartment 130 may be directly in communication with delivery portal 180.

In some embodiments, chute 170 may include a first section 172 that is generally parallel to a longitudinal axis Y of cooler 100, and a second section 174 that is arranged at an angle relative to a transverse axis X of cooler 100, such that a second beverage container 500 falls under the force of gravity within first section 172 of chute 170 onto second section 174. In this way, chute 170 subjects second beverage container 500 to a mechanical impact so as to cause nucleation of a supercooled beverage within second beverage container 500, so as to create a slush beverage within second beverage container 500. First section 172 of chute 170 may have a height h1 of about 6 inches to about 50 inches, or about 12 inches to about 36 inches so that a sufficient mechanical impact is provided by the drop to cause nucleation of a beverage within second beverage container 500 without overly agitating the beverage which may result in a carbonated beverage overflowing, or "exploding," when opened. Further, the height h1 of chute 170 is limited by the height of interior volume 108 of cooler 100. Second section 174 of chute 170 may be disposed at a downward angle θ1 relative to a transverse axis X of cooler 100. The angle may be about 1 to about 20 degrees, or may be about 5 to about 15 degrees. In this way, after second beverage container 500 falls through first section 172 onto second section 174 of chute 170, second beverage container 500 may move or roll along second section 174 toward chute outlet 176 and delivery portal 180 under the force of gravity.

In some embodiments, first section 172 of chute 170 may be arranged at a rear portion 101 of cooler 100 opposite door 140. In this way, an interior volume 108 at a front portion 103 of housing 102 closer to door 140 may be used for storage of first beverage containers 400. Second section 174 of chute 170 extends from a rear portion 101 of housing 102 towards door 140 of housing 102 at front portion 103 of housing 102 and terminates at chute outlet 176. Chute outlet 176 may be in communication with a delivery portal 180 arranged on housing 102, such as on door 140. In this way, delivery portal 180 can be easily accessed by the consumer. In some embodiments, chute 170 may be in communication with a delivery portal 180 on door 140, wherein delivery portal 180 may include a delivery bin 182 for holding a dispensed beverage container. Delivery bin 182 may be in communication with chute 170 when door 140 is in a closed configuration. Delivery bin 182 receives second beverage container 500 dispensed from compartment 130 through chute 170 and can be accessed by consumer from an exterior of cooler 100. In this way, consumer does not have to open door 140 of cooler 100 in order to access the dispensed second beverage container 500.

In operation, a consumer may access an interior volume 108 of cooler 100, such as by opening a door 140 of cooler 100 to access a first beverage container 400 stored at a first predetermined temperature, such that first beverage container 400 is cooled or chilled. Alternatively, a slush beverage may be dispensed from cooler 100 by providing an input to user interface 120, such as a beverage selection. Upon receipt of the input, cooler 100 may dispense a second beverage container 500 from compartment 130, wherein second beverage container 500 is stored at a second predetermined temperature that is at or below a freezing point of a beverage within second beverage container. Second beverage container 500 containing a supercooled liquid is subjected to a mechanical impact in chute 170 by falling under the force of gravity through a first section 172 of chute 170 onto a second section 174 of chute 170 so as to cause nucleation of the beverage thereby producing a slush beverage within second beverage container 500. Chute 170 conveys second beverage container 500 containing a slush beverage to a delivery portal 180 of cooler 100 for access or retrieval by a consumer.

Figure 10:
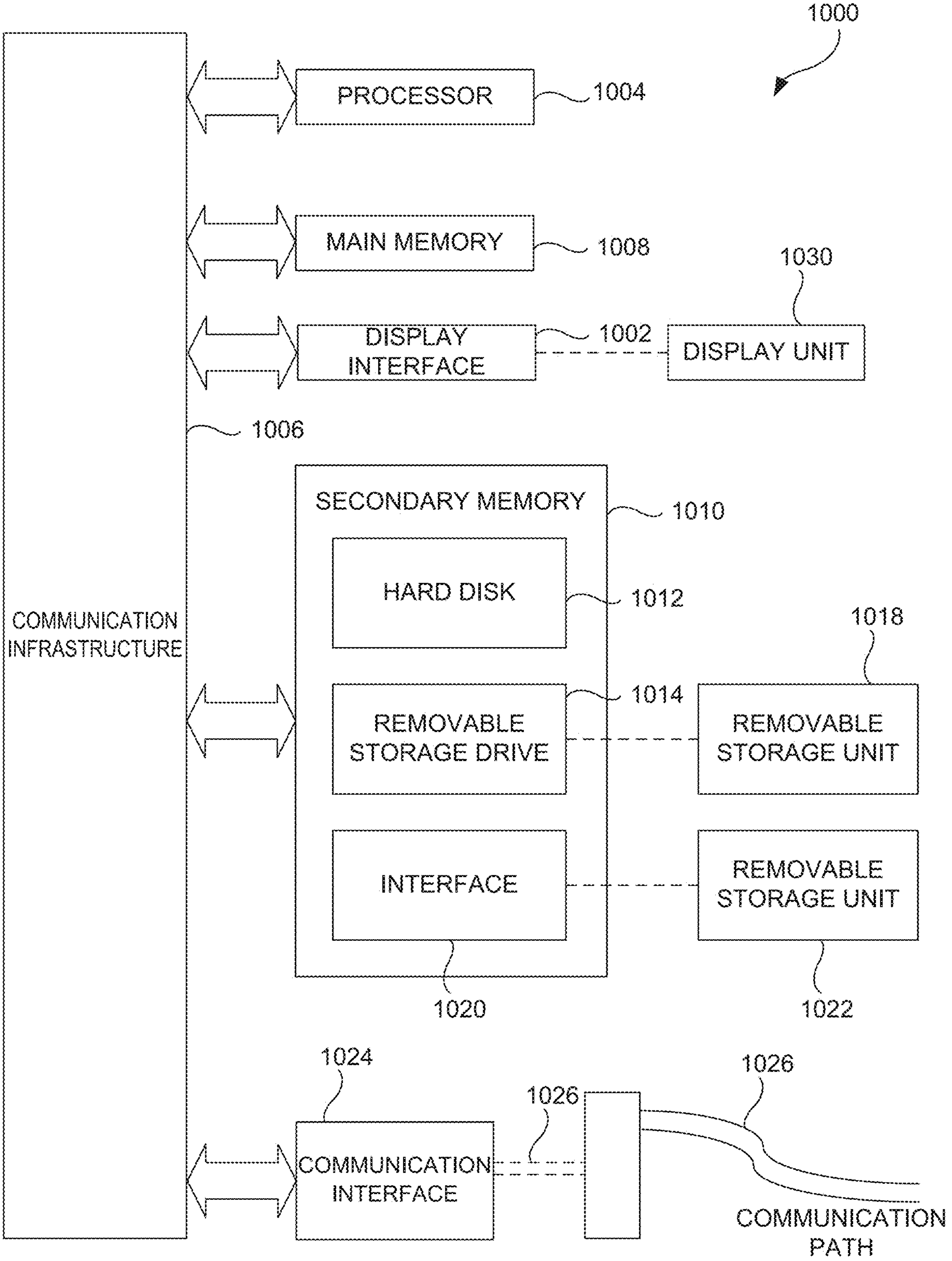
FIG. 10 shows a schematic block diagram of an exemplary computer system in which embodiments may be implemented.

FIG. 10 illustrates an exemplary computer system 700 in which embodiments, or portions thereof, may be implemented as computer-readable code. Control units 150 as discussed herein may be computer systems having all or some of the components of computer system 700 for implementing processes discussed herein.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, and mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention(s) may be implemented in terms of this example computer system 1000. After reading this description, it will become apparent to a person skilled in the relevant art how to implement one or more of the invention(s) using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1004 may be a special purpose or a general purpose processor device. As will be appreciated by persons skilled in the relevant art, processor device 1004 may also be a single processor in a multi-core/multiprocessor system, such system operating alone, or in a cluster of computing devices operating in a cluster or server farm. Processor device 1004 is connected to a communication infrastructure 1006, for example, a bus, message queue, network, or multi-core message-passing scheme.

Computer system 1000 also includes a main memory 1008, for example, random access memory (RAM), and may also include a secondary memory 1010. Secondary memory 1010 may include, for example, a hard disk drive 1012, or removable storage drive 1014. Removable storage drive 1014 may include a floppy disk drive, a magnetic tape drive, an optical disk drive, a flash memory, or the like. The removable storage drive 1014 reads from and/or writes to a removable storage unit 1018 in a well-known manner. Removable storage unit 1018 may include a floppy disk, magnetic tape, optical disk, a universal serial bus (USB) drive, etc. which is read by and written to by removable storage drive 1014. As will be appreciated by persons skilled in the relevant art, removable storage unit 1018 includes a computer usable storage medium having stored therein computer software and/or data.

Computer system 1000 (optionally) includes a display interface 1002 (which can include input and output devices such as keyboards, mice, etc.) that forwards graphics, text, and other data from communication infrastructure 1006 (or from a frame buffer not shown) for display on display unit 1030.

In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to computer system 1000.

Computer system 1000 may also include a communication interface 1024. Communication interface 1024 allows software and data to be transferred between computer system 1000 and external devices. Communication interface 1024 may include a modem, a network interface (such as an Ethernet card), a communication port, a PCMCIA slot and card, or the like. Software and data transferred via communication interface 1024 may be in the form of signals, which may be electronic, electromagnetic, optical, or other signals capable of being received by communication interface 1024. These signals may be provided to communication interface 1024 via a communication path 1026. Communication path 1026 carries signals and may be implemented using wire or cable, fiber optics, a phone line, a cellular phone link, an RF link or other communication channels.

In this document, the terms "computer program medium" and "computer usable medium" are used to generally refer to media such as removable storage unit 1018, removable storage unit 1022, and a hard disk installed in hard disk drive 1012. Computer program medium and computer usable medium may also refer to memories, such as main memory 1008 and secondary memory 1010, which may be memory semiconductors (e.g. DRAMs, etc.).

Computer programs (also called computer control logic) are stored in main memory 1008 and/or secondary memory 1010. Computer programs may also be received via communication interface 1024. Such computer programs, when executed, enable computer system 1000 to implement the embodiments as discussed herein. In particular, the computer programs, when executed, enable processor device 1004 to implement the processes of the embodiments discussed here. Accordingly, such computer programs represent controllers of the computer system 1000. Where the embodiments are implemented using software, the software may be stored in a computer program product and loaded into computer system 1000 using removable storage drive 1014, interface 1020, and hard disk drive 1012, or communication interface 1024.

Embodiments of the invention(s) also may be directed to computer program products comprising software stored on any computer useable medium. Such software, when executed in one or more data processing device, causes a data processing device(s) to operate as described herein. Embodiments of the invention(s) may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventors, and thus, are not intended to limit the present invention(s) and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention(s) that others can, by applying knowledge within the skill of the art, readily modify and/or adapt for various applications such specific embodiments, without undue experimentation, and without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance herein.

The breadth and scope of the present invention(s) should not be limited by any of the above-described exemplary embodiments, but should be defined only in accordance with the following claims and their equivalents.

What is claimed is:

1. A cooler for beverage containers, comprising:

a housing defining a first interior volume for storing a first beverage container at a first predetermined temperature;

a compartment arranged within the first interior volume of the housing for storing a second beverage container at a second predetermined temperature that is at or below a freezing point of a beverage within the second beverage container, wherein the compartment is enclosed;

a user interface for receiving a user input to dispense the second beverage container from the compartment;

a delivery portal for providing access to the second beverage container;

a chute configured to communicate the second beverage container from the compartment to the delivery portal, the chute comprising a first funnel section extending vertically away from the compartment and arranged in a rear portion of the first interior volume, and a second section extending between a distal end of the first funnel section and the delivery portal, wherein the chute is configured to subject the second beverage container to a gravitational drop through the first funnel section and onto a surface of the second section to cause nucleation of the beverage within the second beverage container and form a slush beverage within the second beverage container; and a cooling unit configured to maintain the first interior volume of the housing at the first predetermined temperature and the compartment at the second predetermined temperature, wherein the chute and the compartment form an enclosed channel that defines a second interior volume separate from the first interior volume, and the chute is configured to communicate only the second beverage container to the delivery portal.

2. The cooler of claim 1, wherein the compartment comprises an insulated material.

3. The cooler of claim 1, wherein the compartment further comprises an air inlet port and an adjustable damper configured to regulate a flow of air into the compartment through the air inlet port.

4. The cooler of claim 3, wherein the compartment further comprises a temperature sensor configured to determine a temperature within the compartment, wherein the temperature sensor is in communication with a control unit that controls an orientation of the adjustable damper so as to maintain the compartment at the second predetermined temperature.

5. The cooler of claim 3, wherein the compartment further comprises an air outlet port for allowing a flow of air to exit the compartment.

6. The cooler of claim 1, wherein the compartment comprises an internal passageway for guiding the second beverage container toward the chute.

7. The cooler of claim 1, wherein the second predetermined temperature is −20° C. to 0° C.

8. The cooler of claim 7, wherein the second predetermined temperature is −10° C. to −7° C.

9. The cooler of claim 1, wherein the second section of the chute is arranged at a downward angle relative to a horizontal plane, such that the second section is configured to allow the second beverage container to move along the second section toward the delivery portal under the force of gravity.

10. The cooler of claim 1, wherein the cooling unit comprises an evaporator for distributing a flow of air to the compartment.

11. The cooler of claim 1, wherein the housing comprises a door that is movable from a closed position to an open position in which the first interior volume of the housing is accessible.

12. A cooler for beverage containers, comprising:

a housing defining an interior volume for storing a first beverage container at a first predetermined temperature;

a compartment arranged within the interior volume of the housing for storing a second beverage container at a second predetermined temperature that is at or below a freezing point of a beverage within the second beverage container such that the beverage within the second beverage container is supercooled, wherein the compartment is enclosed;

a delivery portal for providing access to the second beverage container;

a chute extending away from the compartment and communicating the second beverage container from the compartment to the delivery portal, wherein the chute is configured to subject the second beverage container to a gravitational drop onto a surface to agitate the second beverage container such that nucleation of the beverage within the second beverage container occurs during communication of the second beverage container from the compartment to the delivery portal; and a cooling unit configured to maintain the interior volume of the housing at the first predetermined temperature and the compartment at the second predetermined temperature, wherein the chute comprises an enclosed funnel portion disposed between the compartment and the surface, and wherein the enclosed funnel comprises a first section below an outlet of the compartment having a first width and a second section disposed beneath the first section and having a second width less than the first width.

13. The cooler of claim 12, wherein the chute is configured to subject the second beverage container to a gravitational drop of 6 inches to 50 inches along a longitudinal axis of the cooler onto the surface.

14. The cooler of claim 13, wherein the chute is configured to subject the second beverage container to a gravitational drop of 12 inches to 30 inches along the longitudinal axis of the cooler onto the surface.

15. A cooler for beverage containers, comprising:

a housing defining a first interior volume for storing a first beverage container at a first predetermined temperature, the housing comprising a door that is moveable from a closed position to an open position to provide access only to the first beverage container;

a compartment arranged within the interior volume of the housing for storing a second beverage container at a second predetermined temperature that is at or below a freezing point of a beverage within the second beverage container, wherein the compartment is enclosed;

a delivery portal arranged in the door and configured to provide access only to the second beverage container;

an enclosed chute configured to communicate the second beverage container from the compartment to the delivery portal and comprising a first funnel section arranged in a rear portion of the first interior volume, and a second section extending between the first funnel section and the delivery portal, wherein the chute is configured to subject the second beverage container to a gravitational drop through the first funnel section and onto a surface of the second section to cause nucleation of the beverage within the second beverage container and form a slush beverage within the second beverage container; and a cooling unit configured to maintain the interior volume of the housing at the first predetermined temperature and the compartment at the second predetermined temperature, wherein the enclosed chute and the compartment define a second interior volume separate from the first interior volume.

* * * * *